United States Patent
Kang et al.

(10) Patent No.: US 10,664,090 B2
(45) Date of Patent: May 26, 2020

(54) TOUCH REGION PROJECTION ONTO TOUCH-SENSITIVE SURFACE

(71) Applicant: Hewlett-Packard Development Company, L.P., Houston, TX (US)

(72) Inventors: Jinman Kang, San Diego, CA (US); Jordi Morillo Peres, Barcelona (ES); David Bradley Short, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 216 days.

(21) Appl. No.: 15/500,816

(22) PCT Filed: Jul. 31, 2014

(86) PCT No.: PCT/US2014/049248
§ 371 (c)(1),
(2) Date: Jan. 31, 2017

(87) PCT Pub. No.: WO2016/018393
PCT Pub. Date: Feb. 4, 2016

(65) Prior Publication Data
US 2017/0228092 A1 Aug. 10, 2017

(51) Int. Cl.
*G06F 3/041* (2006.01)
*G06F 3/042* (2006.01)
(Continued)

(52) U.S. Cl.
CPC .......... *G06F 3/0416* (2013.01); *G06F 1/1605* (2013.01); *G06F 1/1616* (2013.01);
(Continued)

(58) Field of Classification Search
None
See application file for complete search history.

(56) References Cited

U.S. PATENT DOCUMENTS 7,226,173 B2    6/2007  Aoyanagi
7,348,963 B2    3/2008  Bell
(Continued)

FOREIGN PATENT DOCUMENTS

CN      103608754 A    2/2014
KR      102012007250 A 7/2012
(Continued)

OTHER PUBLICATIONS

Winkler et al., "Tangible Mixed Reality Desktop for Digital Media Management," Dec. 8, 2008, pp. 1-10, Available at: <stefan.winkler.net/Publications/spie6490.pdf>.
(Continued)

*Primary Examiner* — Stephen T. Reed
(74) *Attorney, Agent, or Firm* — HP Inc. Patent Department

(57) ABSTRACT

Examples disclosed herein relate to projecting onto a touch-sensitive surface a projection image having projected regions corresponding to target and non-target touch regions. Examples include a computing system having a touch-sensitive surface, and a camera to capture an image representing an object disposed between the camera and the touch-sensitive surface. The computing system may also include a detection engine to identify, based at least on the object represented in the image, at least one touch region of the touch-sensitive surface, and to generate a projection image including a projected region corresponding to the touch region, and a projector to project the projection image onto the touch-sensitive surface.

14 Claims, 9 Drawing Sheets

(51) Int. Cl.
  *G06F 3/0488* (2013.01)
  *G06F 3/01* (2006.01)
  *G06F 1/16* (2006.01)

(52) U.S. Cl.
  CPC .......... *G06F 1/1639* (2013.01); *G06F 1/1673* (2013.01); *G06F 1/1686* (2013.01); *G06F 3/017* (2013.01); *G06F 3/041* (2013.01); *G06F 3/0418* (2013.01); *G06F 3/0425* (2013.01); *G06F 3/0488* (2013.01); *G06F 2203/04101* (2013.01); *G06F 2203/04106* (2013.01)

(56) References Cited

U.S. PATENT DOCUMENTS

| | | | |
|---|---|---|---|
| 7,599,561 B2 | 10/2009 | Wilson et al. | |
| 7,710,391 B2 | 5/2010 | Bell et al. | |
| 8,103,109 B2 | 1/2012 | Winn et al. | |
| 8,121,640 B2 | 2/2012 | Russ et al. | |
| 8,199,117 B2 | 6/2012 | Izadi et al. | |
| 8,619,049 B2 | 12/2013 | Harrison et al. | |
| 8,736,583 B2 | 5/2014 | Anderson et al. | |
| 8,773,514 B2 | 7/2014 | Gharib et al. | |
| 2005/0078092 A1 | 4/2005 | Clapper | |
| 2005/0162402 A1 | 7/2005 | Watanachote | |
| 2008/0018591 A1 | 1/2008 | Pittel et al. | |
| 2011/0043702 A1 | 2/2011 | Hawkins | |
| 2011/0242054 A1* | 10/2011 | Tsu | G06F 3/0425 345/175 |
| 2011/0267478 A1* | 11/2011 | Jacobs | G06F 1/1616 348/207.11 |
| 2012/0249463 A1* | 10/2012 | Leung | G06F 3/017 345/173 |
| 2012/0280950 A1 | 11/2012 | Stephanick et al. | |
| 2012/0299876 A1 | 11/2012 | De Leon et al. | |
| 2012/0306748 A1 | 12/2012 | Fleizach et al. | |
| 2013/0050145 A1 | 2/2013 | Robinson et al. | |
| 2013/0077236 A1 | 3/2013 | Becze et al. | |
| 2013/0127729 A1 | 5/2013 | Mosby et al. | |
| 2013/0257748 A1 | 10/2013 | Ambrus et al. | |
| 2013/0283213 A1 | 10/2013 | Guendelman et al. | |
| 2013/0307949 A1* | 11/2013 | Zhang | G06F 3/042 348/61 |
| 2013/0343601 A1 | 12/2013 | Jia et al. | |
| 2014/0098224 A1 | 4/2014 | Zhang | |
| 2014/0139717 A1* | 5/2014 | Short | H04N 7/142 348/333.1 |
| 2014/0201685 A1 | 7/2014 | Lim et al. | |
| 2014/0204120 A1 | 7/2014 | Moteki et al. | |
| 2014/0218477 A1 | 8/2014 | Pawelski | |
| 2014/0247249 A1* | 9/2014 | Smith | G06F 3/0426 345/175 |
| 2014/0267029 A1 | 9/2014 | Govil et al. | |
| 2014/0292647 A1* | 10/2014 | Murase | G03B 17/54 345/156 |

FOREIGN PATENT DOCUMENTS

| | | |
|---|---|---|
| TW | 200512636 A | 4/2005 |
| WO | WO-2013054096 A1 | 1/2013 |
| WO | WO-2013108032 A1 | 7/2013 |

OTHER PUBLICATIONS

Licsar, A. et el.; "Hand Gesture Recognition in Camera-projector System"; published: Mar. 10, 2004: http://www.sztaki.hu/~sziranyi/PapersMCl04_licsar.pdf.

Shahram Izadi et al., "C-Slate: A Muiti-Touch and Object Recognition System for Remote Collaboration using Horizontal Surfaces,", 2007, pp. 3-10, IEEE.

* cited by examiner

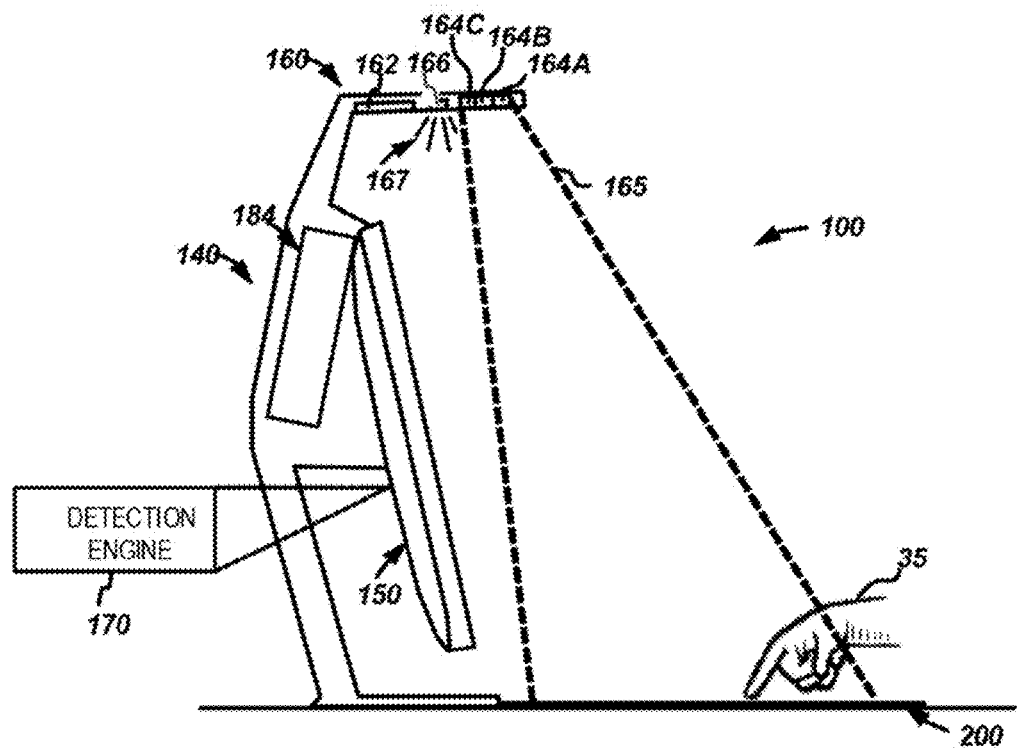
*FIG. 7A*
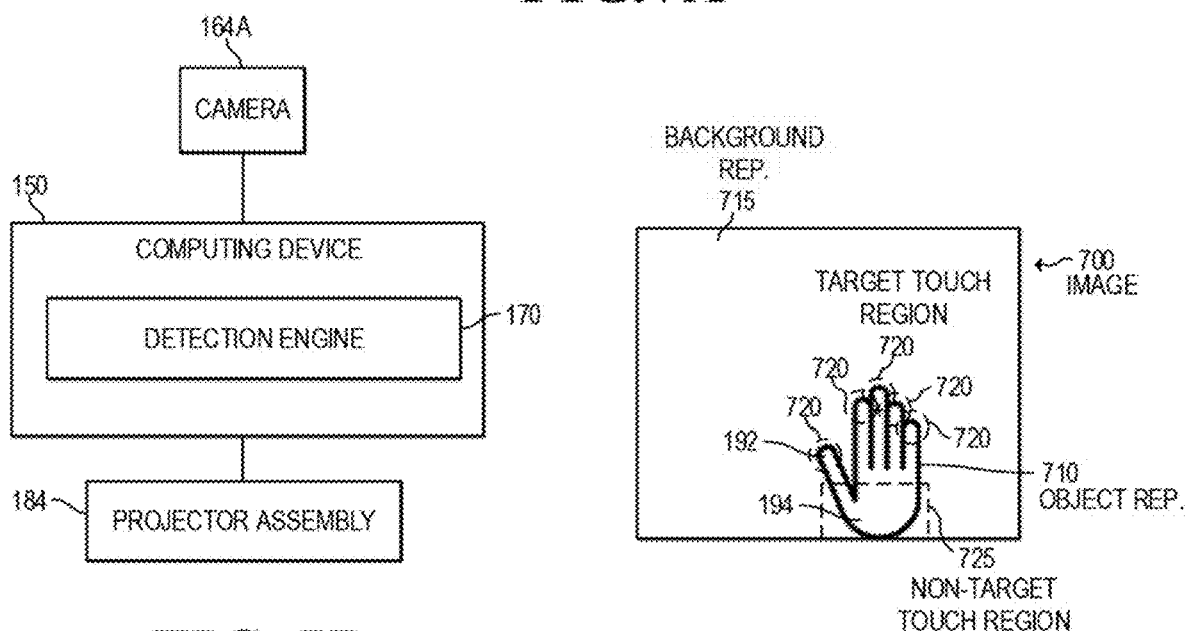
*FIG. 7B*     *FIG. 7C*

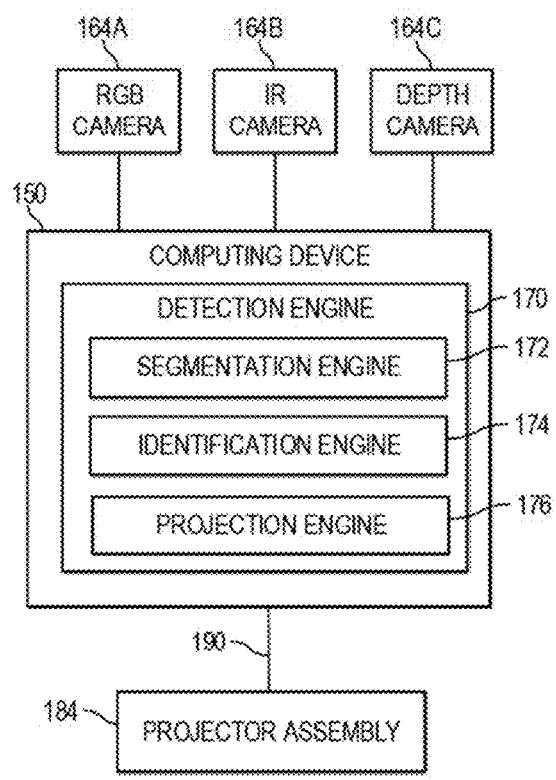
FIG. 7D
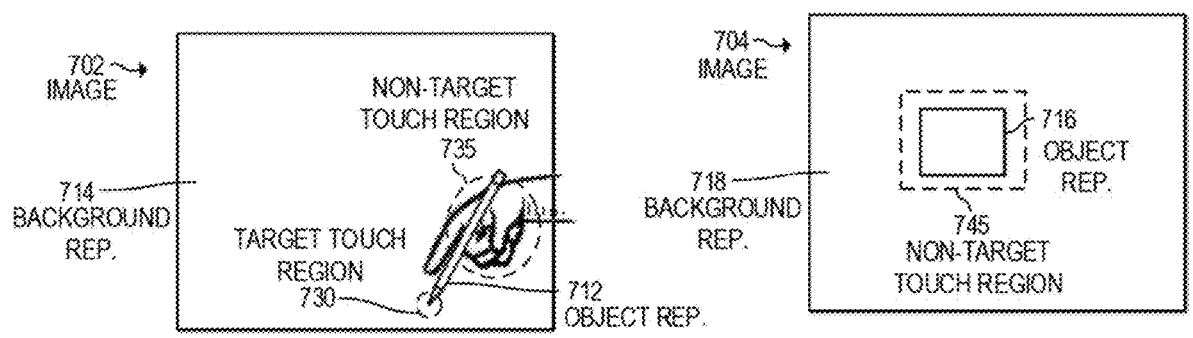
FIG. 7E  FIG. 7F

US 10,664,090 B2

TOUCH REGION PROJECTION ONTO TOUCH-SENSITIVE SURFACE

BACKGROUND

Many computing systems include at least one display and at least one input device. The display may include, for example, a monitor, a screen, or the like. Example input devices include a mouse, a keyboard, a touchpad, or the like. Some computing systems include a touch-sensitive display to both display output of the computing system and receive physical (e.g., touch) input.

BRIEF DESCRIPTION OF THE DRAWINGS

The following detailed description references the drawings, wherein:

FIG. 7A is a schematic side view of the example computing system of FIG. 1 illustrating an example of image capturing;

FIG. 7B is a block diagram of an example of a portion of computing system of FIG. 1 comprising the detection engine;

FIG. 7C is an example image of an object disposed over a ouch-sensitive surface of a computing system;

FIG. 7D is a block diagram of another example of a portion of the computing system of FIG. 1 comprising the detection engine;

FIG. 7E is another example image of an object disposed over a touch-sensitive surface of a computing system;

FIG. 7F is another example image of an object disposed touch-sensitive surface of a computing system;

DETAILED DESCRIPTION

Figure 1:
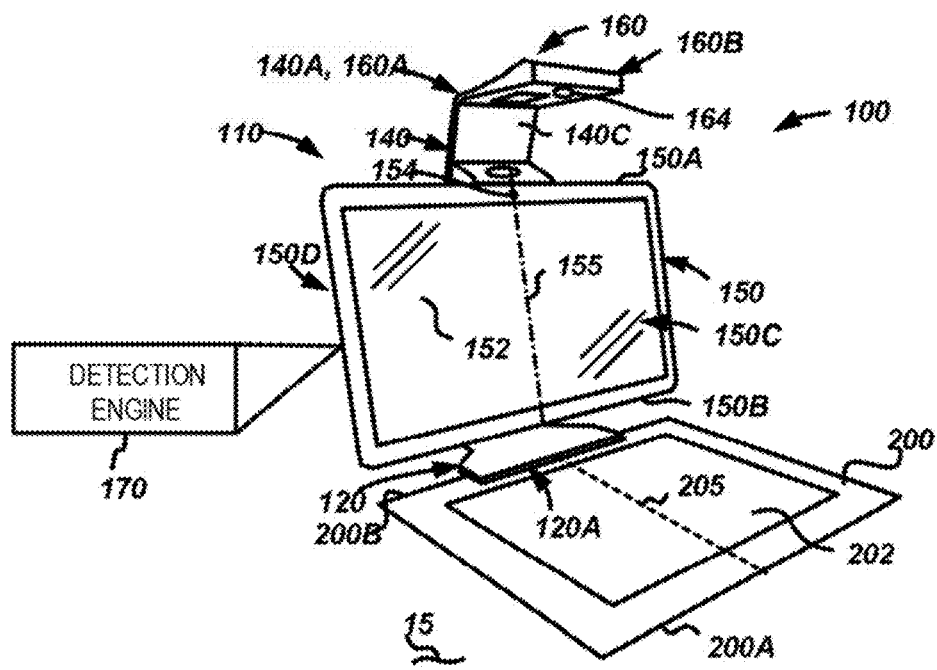
FIG. 1 is a schematic perspective view of an example computing system comprising a detection engine.

In a computing system utilizing a touch-sensitive input device to detect physical contact with the device as touch input, it may be difficult to distinguish between physical contact with the device that is intended as touch input and unintended or accidental physical contact with the touch-sensitive input device. For example, when utilizing a touch-sensitive surface capable of detecting touches made by a hand, it may be difficult to distinguish between physical contact made by the fingertips that is intended as input and physical contact made by the palm resting on the surface and not intended as input.

Examples described herein may identify target or non-target touch regions of a touch-sensitive surface of a computing system based, for example, on an image of representing an object (e.g., a hand) disposed on or above the touch sensitive surface. Examples described herein may project onto the touch-sensitive surface a projection image having projected regions corresponding to the identified target and non-target touch region(s). In some examples, any input touches located outside of any target touch regions or inside of any non-target touch region may be rejected by the computing system as unintentional, and vice versa, any input touches located inside of any target touch regions or outside of any non-target touch region may be accepted by the computing system as intentional. In these examples, users may use the visual indication provided by the projection image to know where on the touch-sensitive surface their touches would be rejected as unintentional and where the touches would be accepted as intentional. Accordingly, the users may exercise extra caution in areas where their touches will be interpreted as intentional and to exercise less caution in other areas.

Referring now to the drawings, FIGS. 1-7A are schematic views of an example computing system 100 comprising a detection engine 170. In the examples of FIGS. 1-7A, system 100 may include a support structure 110, a computing device 150, a projector assembly 184, and a touch-sensitive surface 200. System 100 may also include a sensor bundle 164 pointed at touch-sensitive surface to capture an image representing an object disposed between sensor bundle 164 and touch sensitive surface 200. Computing device 150 may include a detection engine 170 to identify one or more target touch regions of touch-sensitive surface 200 based on at least one characteristic of the object, and projector assembly 184 may project onto touch-sensitive surface 200 an image that includes an indication of the identified target touch region(s).

Computing device 150 may comprise any suitable computing device complying with the principles disclosed herein. As used herein, a "computing device" may comprise an electronic display device, a smartphone, a tablet, a chip set, an all-in-one computer (e.g., a device comprising a display device that also houses processing resource(s) of the computer), a desktop computer, a notebook computer, workstation, server, any other processing device or equipment, or a combination thereof. In this example, device 150 is an all-in-one computer having a central axis or center line 155, first or top side 150A, a second or bottom side 150B axially opposite the top side 150A, a front side 150C extending axially between sides 150A and 150B, a rear side 150D also extending axially between sides 150A and 150B and generally radially opposite front side 150C. A display 152 is disposed along front side 150C and defines a viewing, surface of computing system 100 to display images for viewing by a user of system 100. In examples described herein, a display may include components of any technology suitable for displaying images, video, or the like.

In some examples, display 152 may be a touch-sensitive display in examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture images of a user positioned in front of display 152. In some examples, device 150 may also include a microphone or other device to receive sound input (e.g., voice input from a user).

Figure 2:
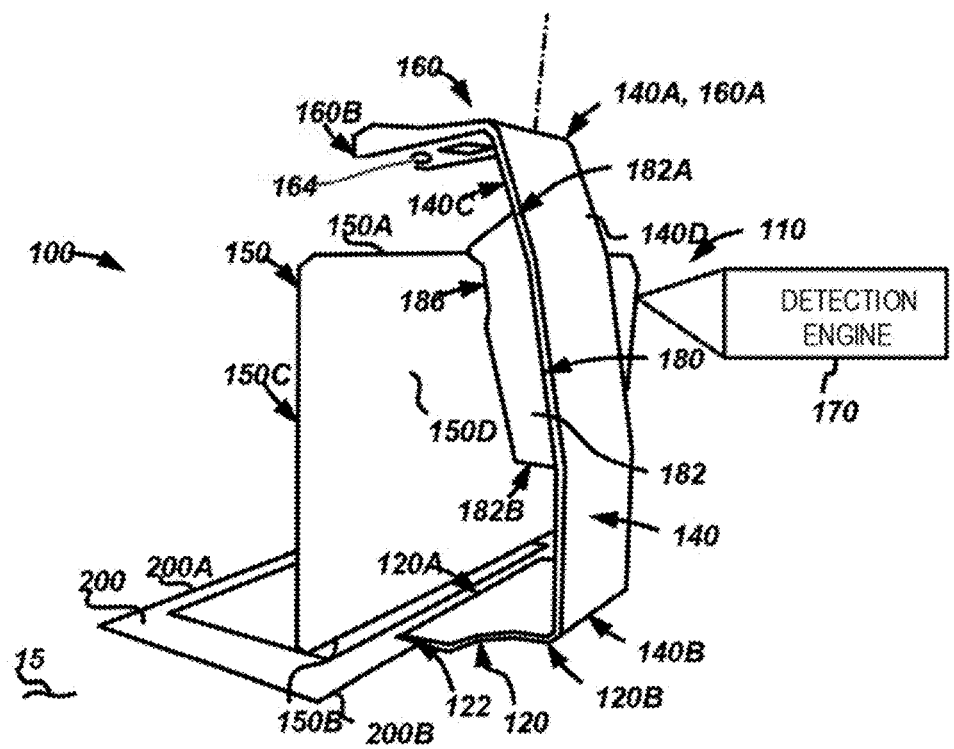
FIG. 2 is another schematic perspective view of the example computing system of FIG. 1.

In the example of FIGS. 1-7A, support structure 110 includes a base 120, an upright member 140, and a top 160. Base 120 includes a first or front end 120A, and a second or rear end 120B. Base 120 may engage with a support surface 15 to support the weight of at least a portion of the components of system 100 (e.g., member 140, unit 180, device 150, top 160, etc.). In some examples, base 120 may engage with support surface 15 in this manner when system 100 is configured for operation. In the example of FIGS. 1-7A, front end 120A of base 120 includes a raised portion 122 that may be disposed above and separated from support surface 15 (creating a space or clearance between portion 122 and surface 15) when base 120 is disposed on support surface 15 as illustrated in FIG. 2 for example. In such examples, a portion of a side of Touch-sensitive surface 200 may be disposed in (e.g., received within) the space formed between portion 122 and surface 15. In such examples, placing a portion of surface 200 within the space created by portion 122 and surface 15 may assist with the proper alignment of surface 200. In other examples, other suitable methods or devices may be used to assist with the alignment of surface 200.

Upright member 140 includes a first or upper end 140A, a second or lower end 140B opposite the upper end 140A, a first or front side 140C extending between the ends 140A and 140B, and a second or rear side 140D opposite the front side 140C and also extending between the ends 140A and 140B. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 160B extends outward from upper end 140A of upright member 140. As such, in the example shown in FIG. 2, top 160 is supported at end 160A (and not at end 160B), and may be referred to herein as a cantilevered top. In some examples, base 120, member 140, and top 160 may be monolithically formed. In other examples, two or more of base 120, member 140, and top 160 may be formed of separate pieces (i.e., not monolithically formed).

Touch-sensitive surface 20 may include a central axis or centerline 205, a first or front side 200A, and a second or rear side 200B axially opposite the front side 200A. Touch-sensitive surface 200 may comprise any suitable technology for detecting physical contact with surface 200 as touch input. For example, touch-sensitive surface 200 may comprise any suitable technology for detecting (and in some examples tracking) one or multiple touch inputs by a user to enable the user to interact, via such touch input, with software being executed by device 150 or another computing device. In examples described herein, touch-sensitive surface 200 may be any suitable touch-sensitive planar (or substantially planar) object, such as a touch-sensitive mat, tabletop, sheet, etc. In some examples, touch-sensitive surface 200 may be disposed horizontally (or approximately or substantially horizontally). For example, surface 200 may be disposed on support surface 15, which may be horizontal (or approximately or substantially horizontal).

In some examples, all or substantially all of surface 200 may be capable of detecting touch input as described above. In other examples, less than all of surface 200 may be capable of detecting touch input as described above. For example, surface 200 may comprise a touch-sensitive region 202, extending over less than all of surface 200, wherein region 202 is capable of detecting touch input as described above. In other examples, region 202 may extend over substantially all of surface 200 (e.g., may be substantially coterminous with surface 200). Region 202 may be substantially aligned with axis 205.

As described above, surface 200 may be aligned with base 120 of structure 110 to assist with proper alignment of surface 200 (e.g., at least during operation of system 100). In the example of FIGS. 1-7A, rear side 200B of surface 200 may be disposed between raised portion 122 of base 120 and support surface 15, such that rear end 200B is aligned with front side 120A of base 120 to assist with proper overall alignment of surface 200 (and particularly proper alignment of region 202) with other components of system 100. In some examples, surface 200 may be aligned with device 150 such that the center line 155 of device 150 is substantially aligned with center line 205 of surface 200. In other examples, surface 200 may be differently aligned with device 150.

In some examples, surface 200 and device 150 may be communicatively connected (e.g., electrically coupled) to one another such that user inputs received by surface 200 may be communicated to device 150. Surface 200 and device 150 may communicate with one another via any suitable wired or wireless communication technology or mechanism, such as, for example, WI-FI, BLUETOOTH, ultrasonic technology, electrical cables, electrical leads, electrical conductors, electrical spring-loaded pogo pins with magnetic holding force, or the like, or a combination thereof. In the example of FIGS. 1-7A, exposed electrical contacts disposed on rear side 200B of surface 200 may engage with corresponding electrical pogo-pin leads within portion 122 of base 120 to communicate information (e.g., transfer signals) between device 150 and surface 200 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of surface 200.

Figure 3:
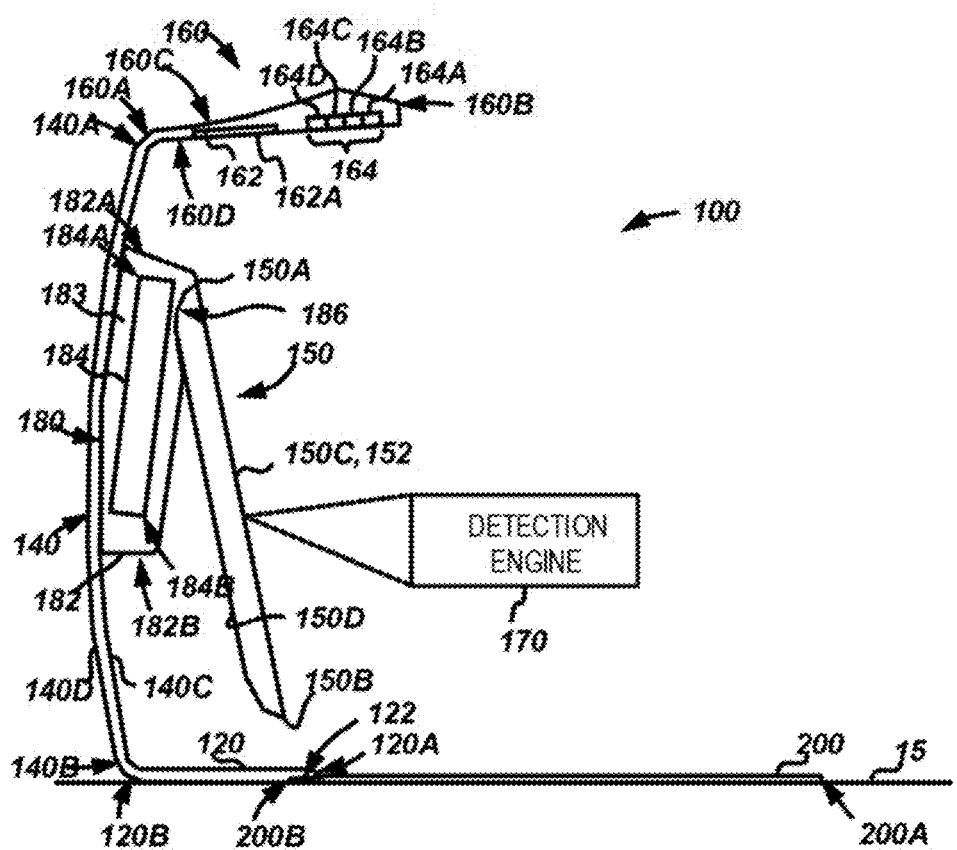
FIG. 3 is a schematic side view of the example computing system of FIG. 1.

Referring to FIG. 3, projector unit 180 comprises an outer housing 182, and a projector assembly 184 disposed within housing 182. Housing 182 includes a first or upper end 182A, a second or lower end 182B opposite the upper end 182A, and an inner cavity 183. In the example of FIG. 3, housing 182 further includes a coupling or mounting member 186 to engage with and support device 150 (e.g., at least during operation of system 100). Member 186 may be any suitable mechanism or device for suspending and supporting any suitable computing device 150 as described herein. For example, member 186 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of unit 180. In some examples, housing 180 and device 150 may be integrally or monolithically formed as a single unit.

Figure 4:
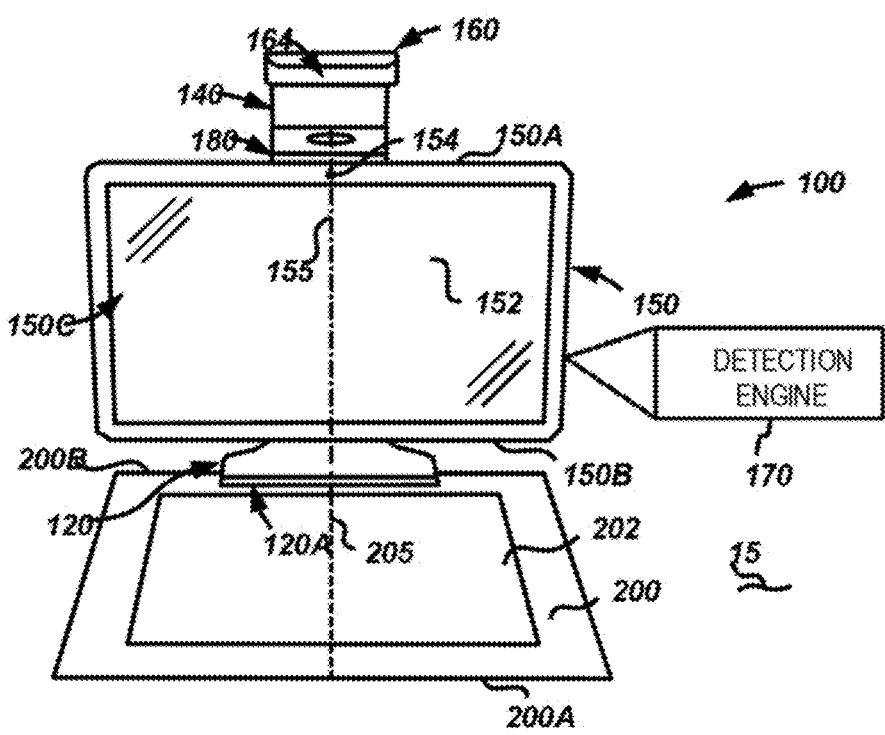
FIG. 4 is a schematic front view of the example computing system of FIG. 1.

Referring to FIG. 4, in some examples, when device 150 is suspended from structure 110 via mounting member 186 on housing 182, projector unit 180 (i.e., both housing 182 and assembly 184) may be substantially hidden behind device 150 when system 100 is viewed from the front substantially facing display 152 disposed on front side 150C of device 150). In addition, as shown in FIG. 4, when device 150 is suspended from structure 110 as described above, projector unit 180 (i.e., both housing 182 and assembly 184) and any image projected thereby may be substantially aligned or centered with respect to center line 155 of device 150.

Referring again to FIG. 3, projector assembly 184 is disposed within cavity 183 of housing 182, and includes a first or upper end 184A, a second or lower end 184B opposite the upper end 184A. Upper end 184A is proximate upper end 182A of housing 182 while lower end 184B is proximate lower end 182B of housing 182. Projector assembly 184 may comprise any suitable digital light projector assembly for receiving data from a computing device (e.g., device 150) and projecting image(s) (e.g., out of upper end 184A) that correspond with that input data. For example, in some implementations, projector assembly 184 may comprise a digital light processing (DLP) projector or a liquid crystal on silicon (LCoS) projector which are advantageously compact and power efficient projection engines capable of multiple display resolutions and sizes, such as, for example, standard XGA resolution (1024×768 pixels) with a 4:3 aspect ratio, or standard WXGA resolution (1280×800 pixels) with a 16:10 aspect ratio. Projector assembly 184 is further communicatively connected (e.g., electrically coupled) to device 150 in order to receive data therefrom and to produce (e.g., project) light and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, an optical connection, an ultrasonic connection, or a combination thereof. In the example of FIGS. 1-7A, device 150 is communicatively connected to assembly 184 through electrical leads or conductors (e.g., as described above in relation to surface 200 and base 120) disposed within mounting member 186 such that, when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162A that is disposed along bottom surface 160D of top 160 and is positioned to reflect light, image(s), etc., projected from upper end 184A of projector assembly 184 toward surface 200 during operation. Mirror 162 may comprise any suitable type of mirror or reflective surface. In the example of FIGS. 1-7A, fold mirror 162 may comprise a standard front surface vacuum metalized aluminum coated glass mirror that acts to fold light emitted from assembly 184 down to surface 200. In other examples, mirror 162 may have a complex aspherical curvature to act as a reflective lens element to provide additional focusing power or optical correction.

Sensor bundle 164 includes at least one sensor (e.g., camera, or other type of sensor) to detect, measure, or otherwise acquire data based on the state of (e.g., activities occurring in) a region between sensor bundle 164 and surface 200. The state of the region between sensor bundle 164 and surface 200 may include object(s) on and/or over surface 200, or activities occurring on and/or near surface 200. In the example of FIG. 3, bundle 164 includes an RGB camera (or image sensor) 164A an IR camera (or IR sensor) 164B, a depth camera (or depth sensor) 164C, and an ambient light sensor 164D. In examples described herein, a camera may be referred to as a "sensor".

In some examples, RGB camera 164A may be a camera to capture color images (e.g., at least one of still images and video). In some examples, RGB camera 164A may be a camera to capture images according to the RGB color model, which may be referred to herein as "RGB images". It is appreciated, however, that in other examples, RGB camera 164A may be a camera to capture image according to other color models, such as YUV, YCbCr, RAW, and so forth. In some examples, RGB camera 164A may capture images with relatively high resolution, such as a resolution on the order of multiple megapixels (MPs), for example. As an example, RGB camera 164A may capture color (e.g., RGB) images with a resolution of 14 MPs. In other examples, RBG camera 164A may capture images with a different resolution. In some examples, RGB camera 164A may be pointed toward surface 200 and may capture image(s) of surface 200, object(s) disposed between surface 200 and RGB camera 164A (e.g., on or above surface 200), or a combination thereof.

IR camera 164B may be a camera to detect intensity of IR light at a plurality of points in the field of view of the camera 164B. In examples described herein, IR camera 164B may operate in conjunction with an IR light projector 166 (see FIG. 7A) of system 100 to capture IR images. In such examples, each IR image may comprise a plurality of pixels each representing an intensity of IR light detected at a point represented by the pixel. In some examples, top 160 of system 100 may include an IR light projector 166 (see FIG. 7A) to project IR light 167 toward surface 200 and IR camera 164B may be pointed toward surface 200. In such examples, IR camera 164B may detect the intensity of IR light reflected by surface 200, object(s) disposed between surface 200 and IR camera 164B (e.g., on or above surface 200), or a combination thereof. In some examples, IR camera 164B may exclusively detect IR light 167 projected by IR light projector 166 (e.g., as reflected from surface 200, object(s), etc., or received directly).

Depth camera 164C may be a camera (sensor(s), etc.) to detect the respective distance(s) (or depth(s)) of portions of object(s) in the field of view of depth camera 164C. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth (measured from camera 164C) of a portion of an object at a point represented by the pixel. Depth camera 164C may be implemented using any suitable technology, such as stereovision camera(s), a single IR camera sensor with a uniform flood of IR light, a dual IR camera sensor with a uniform flood of IR light, structured light depth sensor technology, time-of-flight (TOF) depth sensor technology, or a combination thereof. In some examples, depth sensor 164C may indicate when an object (e.g., a three-dimensional object) is on surface 200. In some examples, depth sensor 164C may detect at least one of the presence, shape, contours, motion, and the respective distance(s) of an object (or portions thereof) placed on surface 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) (e.g., sensor(s), camera(s)) for tracking a user input device such as, for example, a hand, stylus, pointing device, etc. In some examples, the user interface sensor may include a pair of cameras which are arranged to stereoscopically track the location of a user input device (e.g., a stylus) as it is moved by a user about the surface 200 (e.g., about region 202 of surface 200). In other examples, the user interface sensor may additionally or alternatively include IR camera(s) or sensor(s) arranged to detect infrared light that is either emitted or reflected by a user input device. In some examples, sensor bundle 164 may include a gesture camera to detect the performance of predefined gestures by object(s) (e.g., hands, etc.). In some examples, the gesture camera may comprise a depth camera and additional functionality to detect, track, etc., different types of motion over time.

In examples described herein, each of sensors 164A-164D of bundle 164 is communicatively connected (e.g., coupled) to device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIGS. 1-7A, electrical conductors may be routed from bundle 164, through top 160, upright member 140, and projector unit 180 and into device 150 through leads that are disposed within mounting member 186 (as described above).

Figure 5:
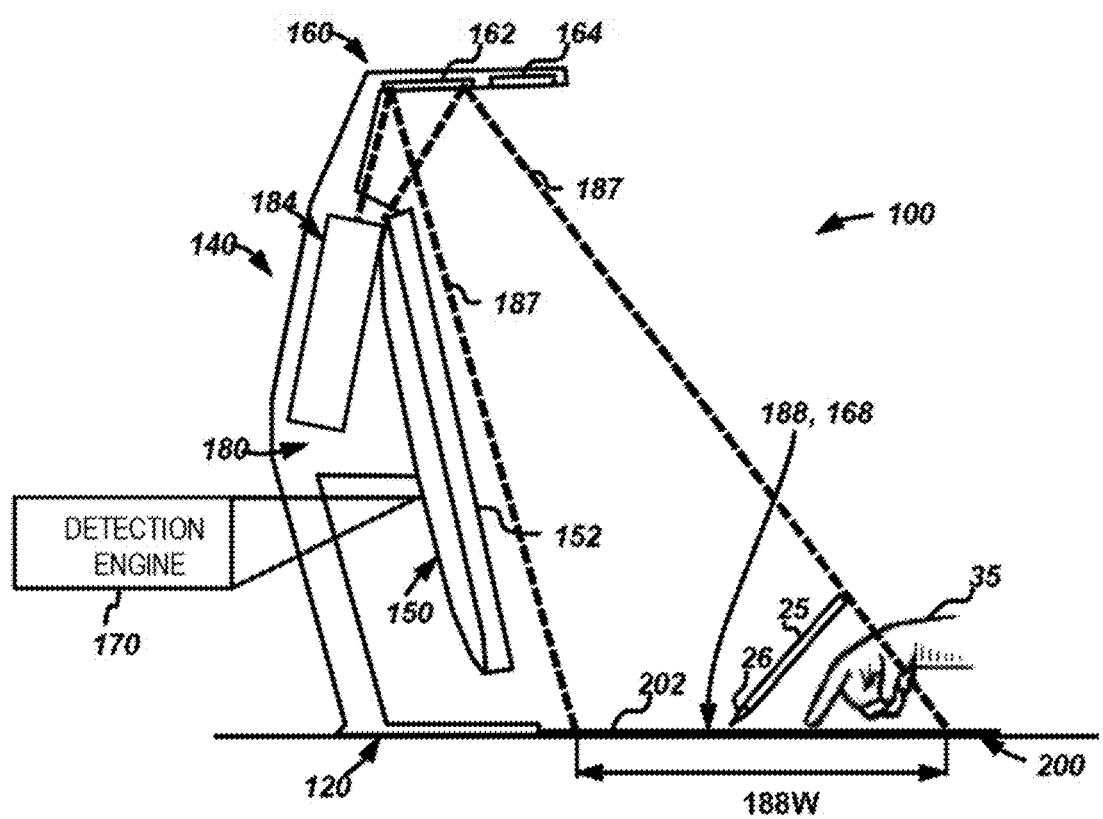
FIG. 5 is a schematic side view of the example computing system of FIG. 1 during an example operation.
Figure 6:
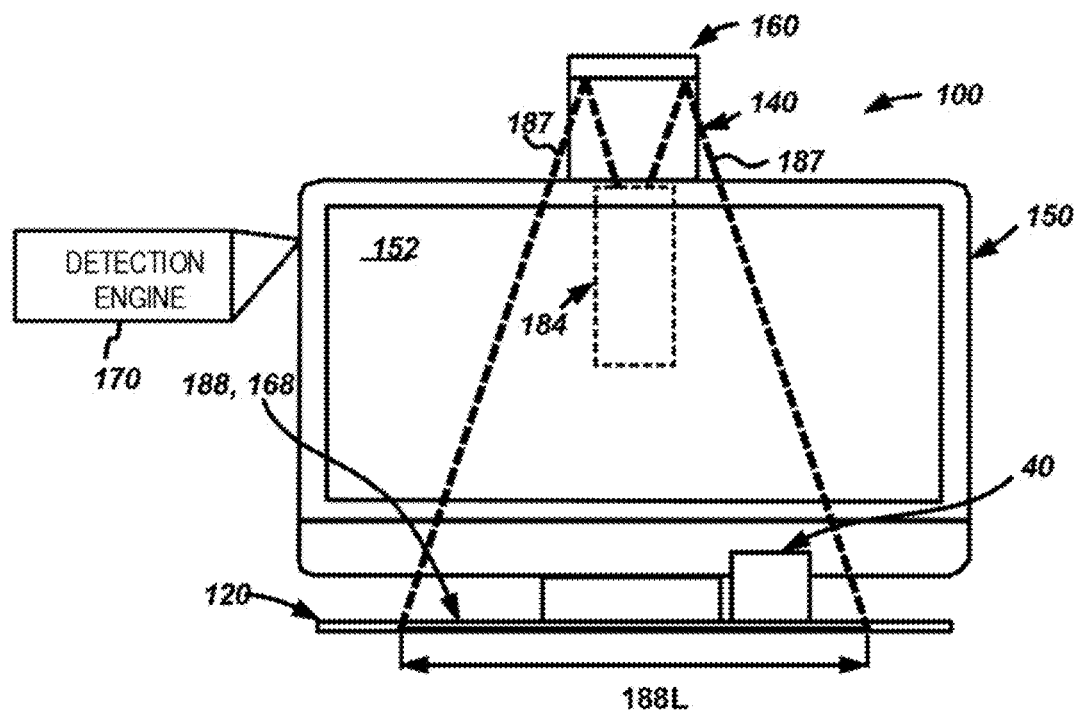
FIG. 6 is a schematic front view of the example computing system of FIG. 1 during another example operation.

Referring to FIGS. 5 and 6, during operation of system 100, projector assembly 184 may project visible light 187 to reflect off of mirror 162 towards surface 200 to thereby display visible image(s) on a projector display space 188 of surface 200. In the example of FIGS. 5-6, space 188 may be substantially rectangular, having a length 188L, and a width 188W. In some examples, length 188L may be approximately 16 inches, while width 188W may be approximately 12 inches. In other examples, length 188L and width 188W may have different values.

In some examples, cameras of sensor bundle 164 (e.g., cameras 164A-164C) are arranged within system 100 such that the field of view of each of the cameras includes a space 168 of surface 200 that may overlap with some or all of display space 188, or may be coterminous with display space 188. In examples described herein, the field of view of the cameras of sensor bundle 164 (e.g., cameras 164A-164C) may be said to include space 168, though at times surface 200 may be at least partially occluded by object(s) on or over surface 200. In such examples, the object(s) on or over surface 200 may be in the field of view of at least one of cameras 164A-164C. In such examples, sensors of sensor bundle 164 may acquire data based on the state of (e.g., activities occurring, in, object(s) disposed in) a region between sensor bundle 164 and space 168 of surface 200. In some examples, both space 188 and space 168 coincide or correspond with region 202 of surface 200 such that functionalities of touch-sensitive region 202, projector assembly 184, and sensor bundle 164 are all performed in relation to the same defined area. A field of view 165 of the cameras of sensor bundle 164 (e.g., cameras 164A-164C) is schematically illustrated in FIG. 7A. In some examples, each of the cameras of sensor bundle 164 (e.g., cameras 164A-164C) may have a slightly different field of view.

Referring now to FIGS. 5-7A, device 150 may direct projector assembly 184 to project image(s) onto surface 200 (e.g., onto region 202). Device 150 may also display image(s) on display 152 (which may be the same as or different than the image(s) projected onto region 202 by projector assembly 184). The image(s) projected by assembly 184 may comprise information and/or images produced by software being executed by device 150. In some examples, a user may interact with the image(s) projected on surface 200 and displayed on display 152 by physically engaging touch-sensitive surface 200 in any suitable manner, such as with users hand 35 (e.g., via touches, taps, gestures, or other touch input), with a stylus 25, or via any other suitable user input device(s). As described above, touch-sensitive surface 200 may detect such interaction via physical engagement with surface 200. Also, in some examples, projector assembly 184 may also project image(s) (at least partially) on objects disposed over surface 200 (e.g., hand 35, as shown in FIG. 5).

As an example, when a user interacts with touch-sensitive surface 200 via physical contact (e.g., with a hand 35, as shown in FIG. 7A), surface 200 may generate touch input information and provide it to device 150 through any suitable connection (examples of which are described above). In some examples, the OS may pass the received touch input to another application (e.g., program, etc.) executing on device 150. In response, the executing OS or application may alter image(s) projected by projector assembly 184, image(s) displayed on display 152, or a combination thereof. As used herein, an "application", "computer application", or "service" is a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.).

In some examples, sensors (e.g., cameras) of sensor bundle 164 may also generate system input which may be provided to device 150 for further processing. For example, system 100 may utilize camera(s) of bundle 164 to detect, at least one of the presence and location of a user's hand 35 (or a stylus 25, as shown in FIG. 5), and provide system input information representing the detected information to device 150. The provided system input information may be passed to at least one of an OS and application being executed by device 150, and may alter image(s) displayed by system 100, as described above in relation to touch input. For example, bundle 164 may include a pair of cameras or sensors that are arranged to perform stereoscopic stylus tracking (e.g., of stylus 25). In other examples, stylus 25 includes a tip 26 coated with an infrared retro-reflective coating (e.g., paint) such that tip 26 may serve as an infrared retro-reflector. In such examples, bundle 164 may include IR camera(s) (or sensor(s)), as described above, which detect IR light that is reflected off tip 26 to enable device 150 to track the location of tip 26 as it moves across region 202. In some examples, surface 200 (with image(s) projected on it by assembly 184) may serve as a second or alternative touch-sensitive display within system 100. In addition, detection of interaction with image(s) displayed on surface 200 may be enhanced through use of sensors of sensor bundle 164 as described above.

In some examples, system 100 may capture two-dimensional (2D) image(s) or create a three-dimensional (3D) scan of a physical object such that an image of the object may then be projected onto surface 200 for further use and manipulation thereof. For example, as shown in FIG. 6, an object 40 may be placed on surface 200 such that sensors of bundle 164 (e.g., at least one of cameras 164A-164C) may detect at least one of the location, dimensions, and color of object 40, to enhance the 2D image(s) or create the 3D scan thereof. In such examples, the information gathered by the sensors of bundle 164 may be provided to device 150 (e.g., an OS, application, service, etc., of device 150), as described above. In some examples, after receiving the information, device 150 (e.g., the OS, application, service, etc.) may direct projector assembly 184 to project an image of object 40 onto surface 200. Object 40 may be, for example, a smartphone, a book, a document, a photo, or any other physical object. In some examples, once object(s) are scanned by sensors of bundle 164, the background of the image representing the object may be removed (e.g., via a segmentation process as described below), and the resulting image of the foreground object may be projected onto surface 200 (or shown on display 152). In such examples, images of physical objects (e.g., an object 40) may be captured, processed, and displayed on surface 200 to quickly and easily create a digital version of the physical object to allow for further manipulation thereof.

FIG. 7B is a block diagram of a portion of computing system 100 of FIG. 1 comprising detection engine 170. In particular, FIG. 7B illustrates an example of computing device 150 that comprises detection engine 170 and is communicatively connected to at, least one camera (e.g., camera 164A) of sensor bundle 164 (as described above) and projector assembly 184, as described above. Although not shown in FIG. 7B, computing device 150 may also be communicatively connected to other components of system 100, as described above.

Computing device 150 (or any other computing device implementing detection engine 170) may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

As noted above, in the example of FIG. 7B, computing device 150 comprises detection engine 170. In other examples, detection engine 170 may comprise additional engine(s). In the example of FIG. 7D, for example, detection engine 170 comprises a segmentation engine 172, an identification engine 174, and a projection engine 176. In some examples, engine 170 may include additional engine(s), such as a rejection engine, further discussed below. In examples described herein, any engine(s) of computing device 150 (e.g., engines 170, 172, 174, 176, etc.) may be any combination of hardware and programming to implement the functionalities of the respective engine. Such combinations of hardware and programming may be implemented in a number of different ways. For example, the programming may be processor executable instructions stored on a non-transitory machine-readable storage medium and the hardware may include a processing resource to execute those instructions. In such examples, the machine-readable storage medium may store instructions that, when executed by the processing resource, implement the engines. The machine-readable storage medium storing the instructions may be integrated in the same computing device (e.g., device 150) as the processing resource to execute the instructions, or the machine-readable storage medium may be separate from but accessible to the computing device and the processing resource. The processing resource may comprise one processor or multiple processors included in a single computing device or distributed across multiple computing devices.

In some examples, the instructions can, be part of an installation package that, when installed, can be executed by the processing resource to implement the engines of system 100. In such examples, the machine-readable storage medium may be a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD), etc.), and the like, or a combination thereof. Further, any machine-readable storage medium described herein may be non-transitory.

Examples of detection engine 170 are described below in relation to FIGS. 7A-7F. As described above, computing system 100 may comprise sensor bundle 164 including at least one camera 164A pointed at touch-sensitive surface 200. In the example of FIG. 7B, computing device 100 includes camera 164A (e.g., RGB camera 164A) pointed at surface 200 (as shown in FIG. 7A). Camera 164A may capture an image 700 representing object 35 (e.g., a hand) disposed between camera 164A and touch-sensitive surface 200. An example image 700 is illustrated in FIG. 7C, in which image 700 includes an object representation 710, which may be a portion of image 700 representing object 35, and a background representation 715, which may be a portion of image 700 representing surface 200. Although FIG. 7C illustrates an example image 700 captured while hand 35 is open, in other examples camera 164A may capture an image of hand 35 held in any other manner (e.g., while pointing a finger, as shown in FIG. 7A).

In the example of FIGS. 7A-7C, detection engine 170 may identify at least one target touch region of the touch-sensitive surface. As used herein, a "target touch region" of a touch-sensitive surface of a computing system may be a region including less than all of the surface and from which the computing system may accept touch input detected by the surface. In examples described herein, detection engine 170 may identify target touch regions based on at least one characteristic (e.g., location, position, orientation, shape, etc.) of the object represented in at least one image captured by at least one camera pointed at surface 200, such as camera 164A. For example, engine 170 may identify a region of touch-sensitive surface 200 that, based on an image of an object disposed over surface 200, is in close proximity to a portion of the object associated with intended touch input. For example, when the object is a hand, the fingertips of the hand may be considered portions of the object associated with intended touch input. In some examples, a region in close proximity to a portion of an object associated with intended touch input may be defined to include locations within a threshold distance of the detected position of the portion of the object itself. For example, where the target touch region is based on a fingertip, the target touch region may be identified as a circle with a radius of 5 mm centered on the fingertip, or the like. In other examples, the region may be a different size, shape, or the like.

As an example, referring to image 700 of FIG. 7C, the object 35 represented in the image may be a hand 35 (represented by object representation 710). In such examples, engine 170 may identify, as a target touch region 720, a region of surface 200 that is in dose proximity to a forefinger of hand 35, which may be associated with intended touch input. In such examples, the target touch region identified by engine 170 may exclude other regions of surface 200 that are in close proximity (e.g., directly beneath) other portions of the object 35 that are not associated with intended touch input. For example, the target touch region 720 associated with the forefinger may exclude the region of surface 200 in close proximity to the palm of hand 35 (e.g., a non-target touch region 725 of FIG. 7C), as the palm may be associated with unintended (e.g., accidental) touch input. In some examples, engine 170 may identify a plurality of target touch regions of surface 200. For example, as shown in FIG. 7C, engine 170 may identify a plurality of target touch regions 720, each being a region of surface 200 in close proximity to (e.g., within a relatively small threshold distance of) a tip, of a respective finger of hand 35 (e.g., including the thumb).

In some examples, any region of surface 200 that is not within a target touch region identified by engine 170 may be considered a non-target touch region. In some examples, surface 200 may include one or more target touch regions, one or more non-target touch regions, other types of touch regions, as well as regions that do not belong to any significant types of regions, such as the background. For example, as illustrated in FIG. 7C, surface 200 includes a non-target touch region 725 that includes locations of surface 200 in close proximity (e.g., directly beneath) the palm of hand 35. Although an example non-target touch region 725 is shown in FIG. 7C, in some examples, the non-target touch region may include region 725 as well as all other areas of surface 200 not contained in at least one of target touch regions 720. In examples described herein, each target touch region of surface 200 identified by engine 170 may be smaller than the full area of surface 200. In the example of FIG. 7C, each identified target touch region 720 includes a respective region of touch-sensitive surface 200 over which a respective fingertip of hand 35 is disposed and excludes another region of surface 200 over which a palm of hand 35 is disposed (e.g., a region 725).

FIG. 7D is a block diagram of another example of a portion of computing system 100. In the example of FIG. 7D, system 100 comprises computing device 150 including detection engine 170 and communicatively connected to projector assembly 184, as described above in relation to FIG. 7B. In the example of FIG. 7D, computing device 150 may also be communicatively connected to cameras 164A-164C of sensor bundle 164, and detection engine 170 may comprise engines 172, 174, and 176.

As described above in relation to FIGS. 7A-7C, at least one camera of bundle 164, pointed at surface 200, may capture image(s) representing an object disposed between the camera(s) and surface 200. In the example of FIG. 7D, segmentation engine 172 may identify a segmentation boundary at least partially representing an outer edge of object 35 based on the captured image(s) In such examples, identification engine 174 of engine 170 may identify at least one target touch region of surface 200 based on characteristic(s) of object 35 corresponding to the segmentation boundary, such as, for example, the shape, orientation, position(s), location(s), etc., of object 35 or portions thereof. For example, in examples in which object 35 is a hand, the characteristics utilized by engine 174 to identify target touch region(s) may include fingertip location(s), palm location(s), etc.

In some examples, segmentation engine 172 may perform a process on a captured image to extract an image of at least one foreground object represented in the captured image. This process may be referred to herein as "segmentation". In some examples, the result of such a segmentation process may be an image of the foreground object separated from at least a background represented in the captured image. In some examples, a segmentation process may comprise determining a segmentation boundary for an object represented in a captured image. As used herein, a "segmentation boundary" for an object represented in an image may be information representing an estimate of which portion(s) of the image represent the object and which portion(s) of the image represent features other than the object (e.g., a background). In some examples, a segmentation boundary for an object represented in an image may include information representing at least one outer edge of the object as represented in the image. When performing a segmentation process, a computing system may use the segmentation boundary to extract an image of the object from a larger captured image (e.g., also representing portions of a background).

In some examples, segmentation engine 172 may determine a segmentation boundary based on an image captured with a camera of sensor bundle 164. For example, engine 172 may determine a segmentation boundary for object 35 based on image 700 captured with camera 164A. In some examples, computing device 150 may use the determined segmentation boundary to extract an image of object 35 from captured image 700 representing more than object 35. The resulting segmented image may be the portion of image 700 representing object 35 (e.g., representation 710) with the portions of image 700 representing other feature(s) (e.g., background representation 715) subtracted out. In such examples, the resulting segmented image may correspond to object representation 710. In examples described herein, a segmentation boundary may be represented in any suitable form, format, data structure, or the like. For example, a segmentation boundary may be represented as a binary mask indicating, for each pixel of at least one corresponding image (e.g., image 700), whether the pixel represents a portion of the object or not. As an example, engine 172 may run a gradient filter over captured image 700 to detect portions of the image having relatively high gradient magnitudes to estimate at least the edge(s) of object 35.

In some examples, identification engine 174 of engine 170 may identify at least one target touch region of surface 200 based on characteristics of object 35 corresponding to the segmentation boundary, such as, for example, shape, orientation, position(s), location(s), etc., of object 35 or portions thereof. In examples described herein, an object "corresponding to" a segmentation boundary may be the object whose outer edge(s) are represented by the segmentation boundary.

In examples in which the object corresponding to the segmentation boundary is a hand, identification engine 174 may identify target touch region(s) in close proximity to respective fingertip(s) of the hand, as described above. In such examples, engine 174 may extract a skeletal model of the hand based on the portion of the captured image representing the hand (e.g., the portion of the image corresponding to and extracted based on the determined segmentation boundary). In such examples, engine 174 may extract the skeletal model of the hand using, for example, a heuristic-based approach, a medial axis transform (MAT), a mesh contraction, a tree-structure extraction algorithm, extraction of a Euclidian skeleton based on a connectivity criterion, or any other suitable technique. Engine 174 may use the extracted skeletal model to determine the location(s) of the fingertips relative to the touch-sensitive surface 200 and identify respective region(s), each within a relatively small threshold distance of one of the fingertips, as target touch region(s) of surface 200 (see, e.g., regions 720 of FIG. 7C). In examples described herein, detection engine 170 may correlate areas of image(s) captured by camera(s) of sensor bundle 164 to locations of surface 200 such that target touch region(s) of surface 200 may be identified based on image(s) captured by the camera(s).

In other examples, in which the object is not a hand, identification engine 174 may identify target touch region(s) differently. For example, the object may be a stylus 25 having a tip 26, as shown in FIG. 5. In such examples, a camera of sensor bundle 164 may capture an image 702 (see FIG. 7E) representing the stylus 25 disposed between the camera and surface 200. In such examples, image 702 may include an object representation 712 (representing stylus 25) and a background representation 714 (representing surface 200 and a hand holding the stylus). In such examples, engine 172 may segment at least a portion of object representation 712 from image 702 and engine 174 may identify a target touch region 730 of surface 200 including locations in close proximity to (e.g., within a threshold distance of) the location of tip 26. In such examples, all other regions of surface 200 may be considered non-target touch regions, including, for example, a non-target touch region 735 of surface 200 over which a palm of the hand holding stylus 25 is disposed.

In still other examples, identification engine 174 may identify non-target touch region(s) based on characteristics) of an object in an image captured by a camera of sensor bundle 164. For example, a physical object 40 may be placed on surface 200, as shown in FIG. 6. In such examples, a camera of sensor bundle 164 may capture an image 704 (see FIG. 7F) representing the object 40 disposed between the camera and surface 200. In such examples, image 704 may include an object representation 716 (representing object 40) and a background representation 718 (representing surface 200). In such examples, engine 172 may segment object representation 716 from image 704 and engine 174 may identify a non-target touch region 745 of surface 200 including locations including and closely surrounding (e.g., within a threshold distance of) location(s) of object 40 relative to surface 200. In such examples, locations closely surrounding object 40 may be identified as a non-target touch region 745.

As described above, computing system 100 may comprise a plurality of different types of cameras in sensor bundle 164. In some examples, computing system 100 may utilize the cameras of different types to capture a plurality of images, each representing an object disposed between touch-sensitive surface 200 and the respective camera used to capture the image. In some examples, each of the plurality of cameras may be a different one of an RGB camera 164A, an IR camera 164B, a depth camera 164C, and gesture camera, as described above.

For example, as shown in FIG. 7D, computing system 100 may comprise computing device 150 communicatively connected to each of RGB camera 164A, IR camera 164B, depth camera 164C, and touch-sensitive surface 200. In such examples, each of cameras 164A-164C may be pointed at surface 200 and may capture a respective image representing an object disposed between the respective camera and surface 200.

In such examples, segmentation engine 172 may identify the segmentation boundary for the object based on each of the plurality images. In some examples, cameras 164A-164C may be at different physical locations. As such, cameras 164A-164C may capture respective images of the same scene (e.g., viewing surface 200 from above) from slightly different angles. In such examples, detection engine 170 may geometrically align the respective images of the object captured by cameras 164A-164C. For example, detection engine 170 may construct at least one homography (or other mapping(s)) for the pixels of cameras 164A-164C such that pixels corresponding to the same image features (e.g., object 35) may be identified in each of the images. The homography or other mapping may be determined in any suitable manner. In some examples, detection engine 170 may map the pixels of each of the images to a common set of coordinates to geometrically align the images. In some examples, the engine 170 may also map locations of surface 200 to the common set of coordinates, or otherwise correlate locations of surface 200 to the pixels of the captured images. In some examples, engine 170 may perform such geometric alignment prior to performing other functionalities of a segmentation process.

In some examples, segmentation engine 172 may determine the segmentation boundary for the object represented in the image as described above, but based on the data in each of the captured images, rather than the data of one image, as described above. Engine 172 may utilize the data of each of the images together in any suitable manner to determine the segmentation boundary. For example, engine 172 may run a gradient filter over the data of each of the captured images to detect relatively high gradient magnitudes to estimate the locations of edge(s) of the object. For example, engine 172 may estimate that a given location (e.g., of the common coordinates) represents an edge of the object if the data from any of the images suggests (or otherwise indicates) the presence of an edge. In other examples, engine 172 may not estimate that a given location represents an edge of the object unless more than one (or all) of the images suggest (or otherwise indicate) the presence of an edge. In some examples, engine 172 may additionally or alternatively utilize various heuristic(s), rule(s), or the like, for estimating the presence of edges of an object based on the data of each of the captured images. In some examples, engine 172 may apply different weights to the data of the different images and may identify edge locations (and thus a segmentation boundary) based on the weighted data from each of the captured images. Additionally, in some examples, engine 172 may determine the segmentation boundary for the object after surface 200 detects a touch input. In such examples, engine 172 may determine the segmentation boundary based on portions of each of the images that correspond to a region of surface 200 in the vicinity of the detected touch input and that includes less than ail of surface 200.

In some examples, it may be difficult to accurately determine a segmentation boundary for an object based on an image captured by a single camera, as certain conditions may make it difficult to accurately distinguish the foreground object from the background in the image. For example, it may be difficult to accurately determine a segmentation boundary based on an image captured by a color camera (e.g., an RGB camera) in the presence of shadows, or when the foreground object and the background are very similar in color. By using multiple images from cameras of different types, examples described herein may more accurately determine a segmentation boundary, as conditions affecting segmentation performed on images from one type of camera may not affect segmentation on images from camera of a different type. For example, an image captured by an IR camera may not be affected by either shadows or color similarity.

After identification engine 174 identifies one or more target touch region and/or one or more non-target touch regions, projection engine 178 may be configured to generate and provide to projector assembly 184 a projection image 190 to be projected onto touch-sensitive surface 200. In some examples, projection image 190 may visually indicate the identified target touch regions and/or non-target touch regions (hereinafter, collectively referred to as "touch regions") on touch-sensitive surface 200. For example, in some implementations, projection image 190 may include one or more projected regions corresponding (e.g., spatially) to the one or more respective touch regions of surface 200 identified by identification engine 174. In some implementations, each projected region of projection image 190 may correspond to the corresponding touch region in terms of shape, size, orientation, location, position, and other spatial characteristics. Thus, in some examples, each projected region may coincide with the corresponding touch region such that the projected region overlays the corresponding touch region, covering the corresponding touch region entirely or substantially entirely (e.g., more than 90% of the touch region's area) and covering no additional areas or substantially no additional areas (e.g., not more than 10% of the touch region's area). In some examples, a projected region may include the corresponding touch region and an additional boundary of a predefined thickness around the corresponding touch region. In yet other examples, a projected region may be smaller than the corresponding touch region (e.g., by a predefined percentage) and it may be included in the corresponding touch region.

In some implementations, a projected region of projection image 190 may have distinct visual characteristics, such as a background color, average brightness level, pattern, symbol(s), and any combination of these or other visual characteristics. Due to distinct visual characteristics, a projected region may stand out and be visually distinguishable from its surrounding area(s) and other areas. Thus, a projected region may highlight the corresponding underlying touch region of touch-sensitive surface 200, thereby providing an indication to the user that the corresponding underlying region of touch-sensitive surface 200 is a target touch region, a non-target touch region, or an otherwise significant region. In some implementations, all projected regions may have the same visual characteristics. In other implementations, different types of projected regions may have different visual characteristics. For example, all non-target touch regions may be represented in projection image 190 by regions having a first combination of color, brightness, pattern, etc., and all target touch regions may be represented in the projection image 190 by regions having a second combination of color, brightness, pattern, etc.

In some implementations, only one type of touch regions (e.g., only target touch regions or only non-target touch regions) may be represented by projected regions in projection image 190, while other types of touch regions may not be represented in projection image 190.

In some implementations, in order to make a projected region stand out and be visually distinct from its surrounding area, projection image 190 may include a background having distinct visual characteristics (e.g., color, average brightness level, pattern, symbol(s), etc.), in which case the projected region may not have distinct visual characteristics but may still stand out from the background.

In some implementations, a projected region may have a boundary line at its boundary, which may be, for example, a solid line or a dashed line. It will be appreciated, however, that the region's boundary may be visible on projection image 190 even if the boundary is not delineated by a special boundary line, at least due to the projected region's distinct visual characteristics relative to its surrounding area.

Figure 7G:
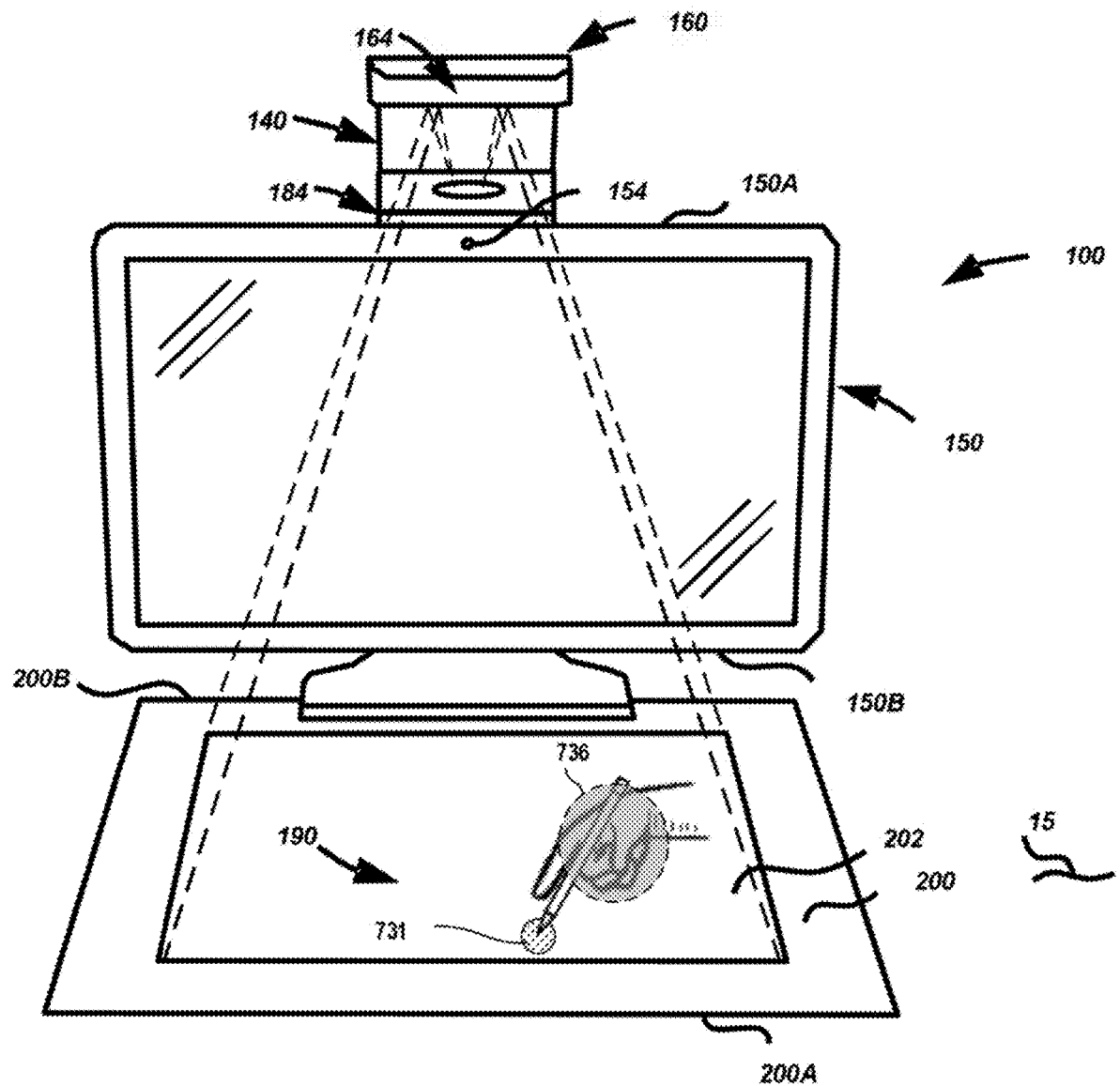
FIG. 7G is a schematic front view of a portion of the example computing system of FIG. 1 with an example image projected onto a touch-sensitive surface of a computing system.

FIG. 7G illustrates an example projection image 190 being projected by projector assembly 184 onto touch-sensitive region 202 of touch-sensitive surface 200. In this example, projection image 190 includes a projected region 736 corresponding to non-target touch region 735 depicted in FIG. 7E, and a projected region 731 corresponding to target touch region 730 depicted in FIG. 7E. In this example, projected region 736 is characterized by a solid gray background color and a dashed boundary line, and projected region 731 is characterized by a dotted background and a solid boundary line.

Figure 7H:
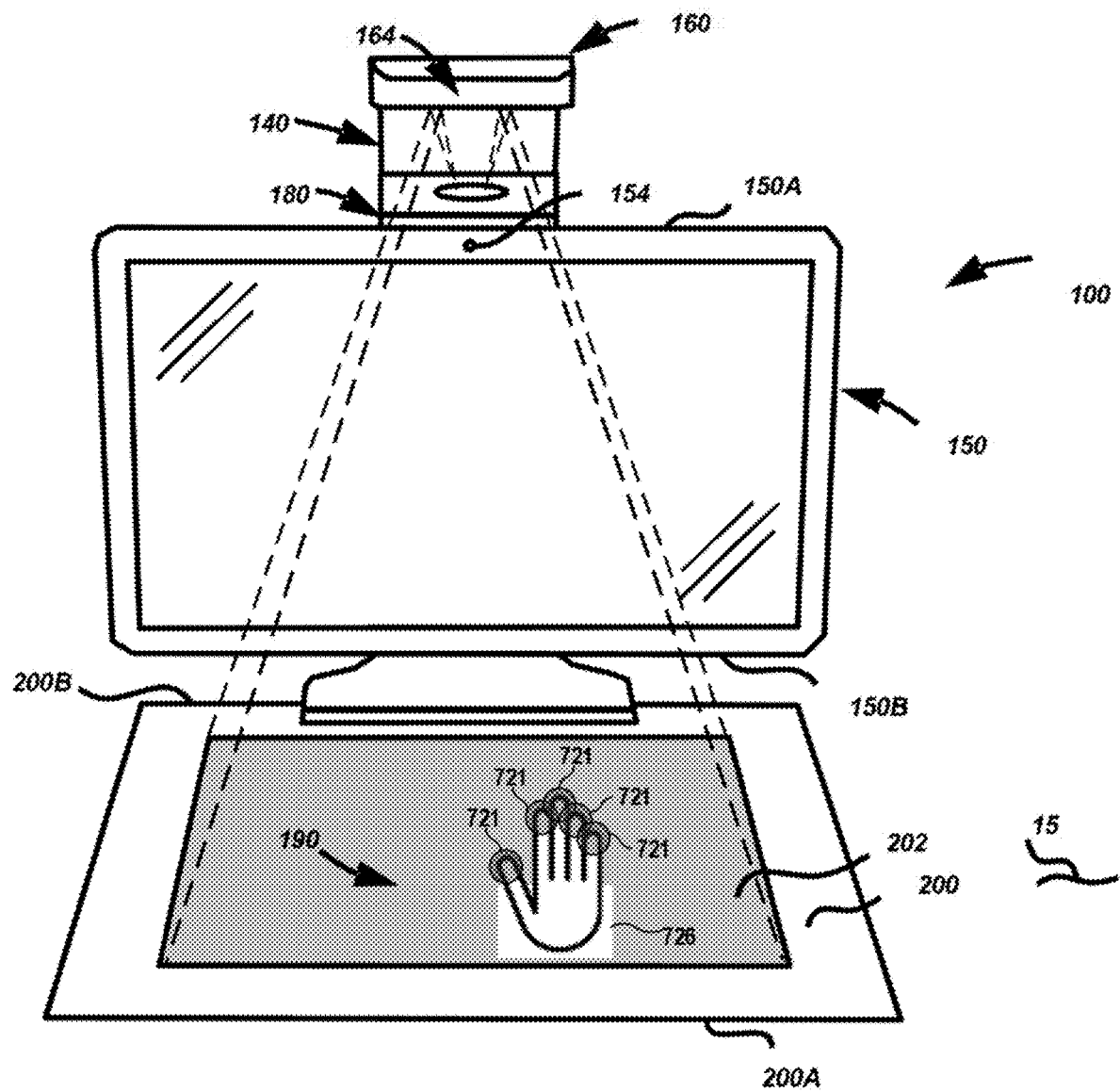
FIG. 7H is a schematic front view of a portion of the example computing system of FIG. 1 with another example image projected onto a touch-sensitive surface of a computing system.

FIG. 7H illustrates another example of projection image 190. In this example, projection image 190 includes projected regions 721 corresponding to target touch region 720 depicted in FIG. 7C, and a projected region 726 corresponding to non-target touch region 725 depicted in FIG. 7C. In this example, projected regions 721 are characterized by a solid dark-gray background color and a dashed black boundary line, and projected region 731 is characterized by a solid white background and no boundary line. In this example, projection image 190 also includes a medium-gray background, which makes otherwise undistinctive projected region 726 stand out and be visually distinct from its surroundings.

As illustrated in FIGS. 7G and 7H, in some implementations, a projected region may be projected at least partially on an object (e.g., hand 35, object 40, stylus 25, etc.) and at least partially on an area surrounding the object. In some implementations (not shown), projection engine 176 may generate exclude from the projected region(s) any portions that would be projected on the object. In some implementations, features and functionalities described herein in relation to FIGS. 1-7H may be provided in combination with features and functionalities described herein in relation to any of FIGS. 8-10.

In some implementations, computing device 150 may also use the identified target touch regions and non-target touch regions to accept and reject touch inputs from touch-sensitive surface 200. For example, computing device 150 may include a rejection engine that may reject a detected touch input in response to a determination that the location of the detected touch input is not within any of the identified target touch regions or is within any of the identified non-target touch regions of touch-sensitive surface 200. Additionally or alternatively, the rejection engine that may accept a detected touch input in response to a determination that the location of the detected touch input is within any of the identified target touch regions or is not within any of the identified non-target touch regions of touch-sensitive surface 200. In some examples, to accept or reject a given touch input, the rejection engine may pass or not pass, respectively, the given touch input (i.e., information describing the given touch input) to a touch input processing function of computing device 150, which may be included in an OS or other application being executed by computing device 150, such that the given touch input may have an effect on application(s), service(s), and/or other aspect(s) of computing system 100 outside of rejection engine 170. Thus, in some examples, by projecting projection image on touch-sensitive surface 200 as described above, computing system 100 may provide the user with a visual indication of one or more regions from which touch inputs would be rejected and one or more regions from which touch inputs would be accepted.

Figure 8A:
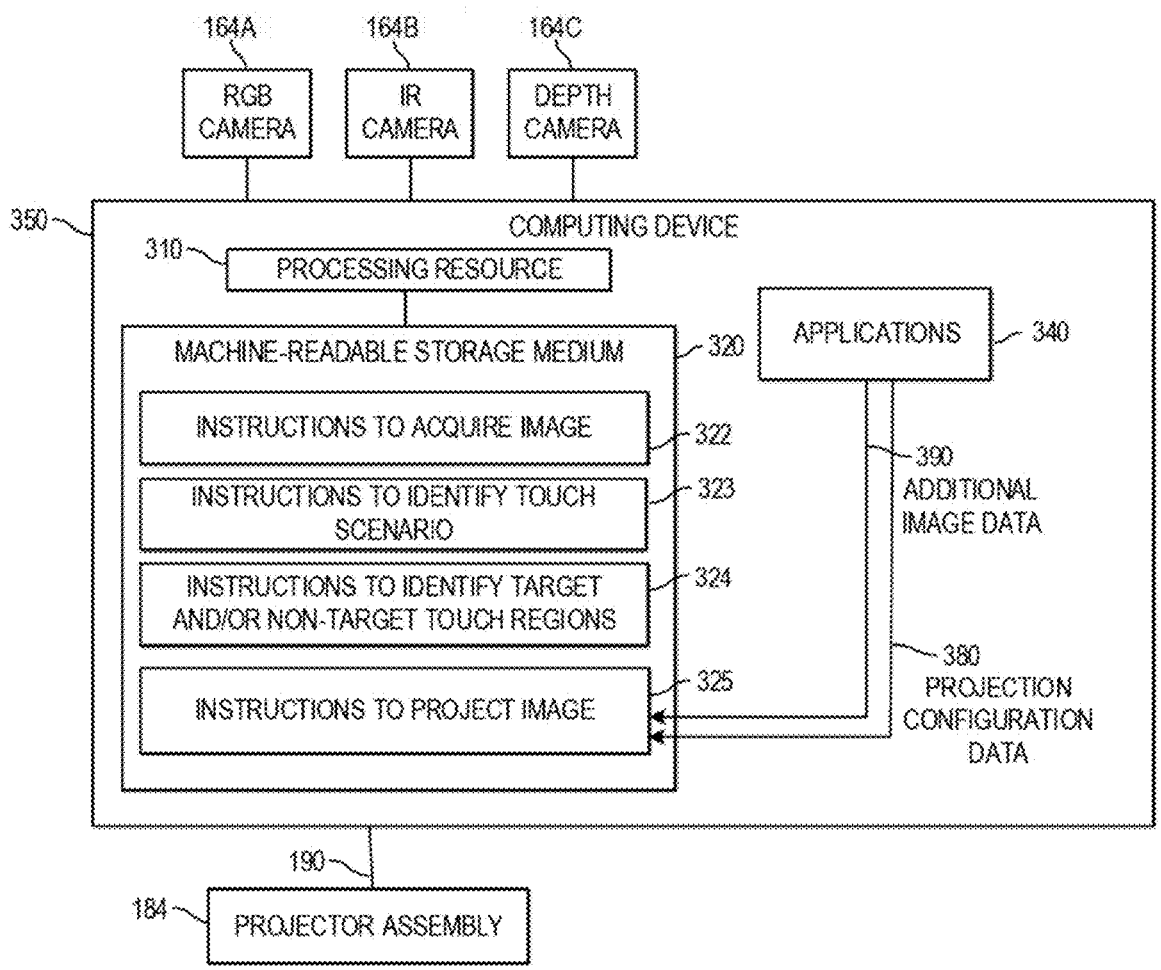
FIG. 8A is a block diagram of an example computing device to determine a target touch region.

FIG. 8A is a block diagram of another example computing device 150. In the example of FIG. 8A, computing device 150 is communicatively connected to projector assembly 184 and cameras 164A-164C, as described above. Each of cameras 164A-164C may be disposed above and pointed at surface 200. Computing device 150 may further include a processing resource 310 and a machine-readable storage medium 320 comprising (e.g., encoded with) instructions 322-325. In some examples, storage medium 328 may include additional instructions. In other examples, instructions 322-325 and any other instructions described herein in relation to storage medium 320, may be stored on a machine-readable storage medium remote from but accessible to computing device 150 and processing resource 318. Processing resource 310 may fetch, decode, and execute instructions stored on storage medium 320 to implement the functionalities described below. In other examples, the functionalities of any of the instructions of storage medium 320 may be implemented in the form of electronic circuitry, in the form of executable instructions encoded on a machine-readable storage medium, or a combination thereof. Machine-readable storage medium 320 may be a non-transitory machine-readable storage medium.

In the example of FIG. 8A, instructions 322 may acquire, from at least one of cameras 164A-164C, at least one image representing an object disposed between the camera and surface 200. Instructions 323 may identify a current touch input scenario for computing system 100 among a plurality of different touch input scenarios for computing system 100. As used herein, a "touch input scenario" is a mode for providing touch input to a computing system via a touch-sensitive surface of the computing system. In examples described herein, touch input scenarios are different if a computing system is to handle touch input differently for each of the touch input scenarios (which may also be referred to herein as "distinct" touch input scenarios). In some examples, the plurality of different touch input scenarios for computing system 100 may include, for example, a hand input scenario, a stylus input scenario, an object input scenario, and a finger input scenario, as described below.

Instructions 324 may identify at least one target touch region of surface 200 based on at least a location of the object as represented in the captured image(s). In some examples, instructions 324 may identify the target touch region(s) based on any combination of characteristics (e.g., shape, orientation, etc.) of the object as represented in the captured image(s). Instructions 324 may identify the target touch input(s) differently for each touch input scenario of the plurality of touch input scenarios for computing system 100. For example, instructions 324 may identify the target touch input(s) differently when the hand input scenario is identified than when the stylus input scenario is identified.

Instructions 325 may generate, based at least on the touch regions identified by instructions 324, projection image 190 and provide it to projector assembly 184 to be projected on touch-sensitive surface 200, as described above.

In some examples, instructions 325 may receive projection configuration data 380 from at least one other component of computing system 100, in which case projection image 190 may be generated also based on the received projection configuration data 380. Instructions 325 may receive projection configuration data 380, for example, from applications 340 (e.g., an OS) executed by computing device 150 of computing system 100.

Projection configuration data 330 may indicate, for example, which touch regions, if any, should be represented by (e.g., reflected in) projection image 190. For example, projection configuration data 380 may define which type(s) of touch regions (e.g., target touch regions, non-target touch regions, neither, or both) should be reflected by a corresponding projected region in projection image 190. Projection configuration data 380 may also define for each type of region that should be reflected in projection image 190 by a projected region, the visual characteristics of such projected region, such as its color, average brightness level, pattern, symbol(s), boundary line (if any) etc. In some implementations, projection configuration data 380 may also define for each type of projected region its spatial characteristics (e.g., shape, size, and position) relatively to the spatial parameters of its corresponding touch region. For example, projection configuration data 380 may define that the center of the projected region should coincide with the center of the touch region, and that the shape and size of the regions should be the same or substantially the same. In other examples, projection configuration data 380 may define that the center of the projected region should coincide with the center of the touch region, but that size of the projected region should be slightly larger or smaller (e.g., by 10%) than the size of the corresponding touch region.

In some examples, projection image 190 may include, in addition to projected region(s) corresponding to touch region(s), additional image data, such as additional image data 390. Additional image data 390 may include graphics, text, images, or any other type of visual, data, and may be received by instructions 325 from one or more applications 340. Additional image data 390 may include, for example, graphics corresponding to (e.g., tracing) user input received through touch-sensitive surface 200.

Figure 8B:
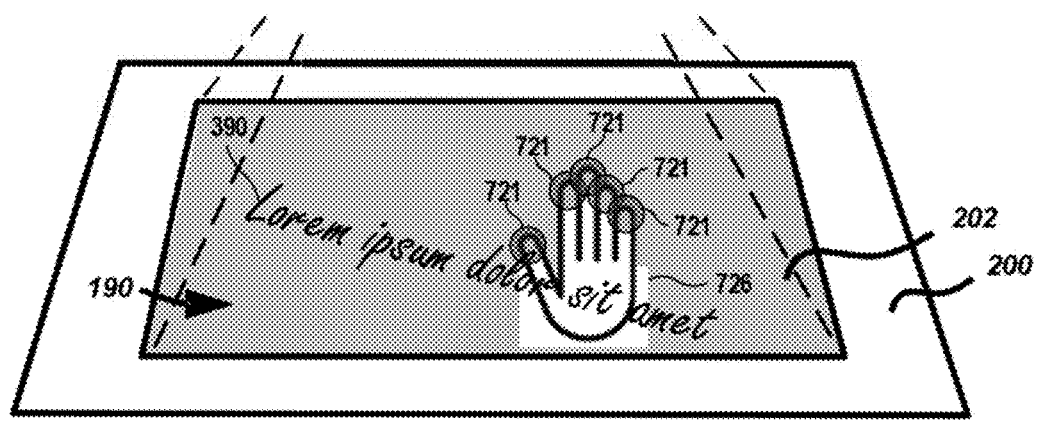
FIG. 8B is a schematic front view of a portion of the example computing system of FIG. 1 with another example image projected onto a touch-sensitive surface of a computing system.

In some examples, instructions 325 may combine additional image data 390 with the projected regions described above (e.g., by overlaying additional image data 390 on the projected regions or vice versa) to generate projection image 190. It is appreciated that even if projection image 190 combines (e.g., overlays) additional image data with projected regions, the projected regions and their boundaries may still be visually distinguishable. To illustrate this FIG. 8B shows an example image data 190 that combines projected regions 721, projected region 726, and other image data 390. Even though additional image data 390 overlaps with projected region 726 and one of projected regions 721, those projected regions are still visually distinguishable, that is, the users can still visually determine the locations and the shapes of the projected regions. Based on the projected regions, the user can also determine the locations and the shapes of the corresponding (e.g., underlying) touch regions.

In other examples, instructions 325 may not receive additional image data 390; instead, instructions 325 may send to projector assembly 184 projection image 190 that includes the projected regions but does not include additional image data 390. In such examples, projector assembly 184 may receive additional image data from another source (e.g., from one or more applications 340), combine additional image data with projection image 190, and project the combined image onto touch-sensitive surface 200. In yet other examples, instructions 325 may send projection image 190 that includes the projected regions but not additional image data 390 to other instructions and/or application(s), which may, in turn, generate or receive additional image data, combine the data with projection image 190, and send the combined data to projector assembly 184 for projection.

As noted above, instructions 323 may identify current touch input scenario for computing system 100. In examples described herein, instructions 323 may determine the touch input scenario based, at least in part on the object disposed between sensor bundle 164 and surface 200. For example, the object may be a stylus 25, as illustrated in FIGS. 5 and 7E. In such examples, instructions 323 may identify a stylus input scenario as the current touch input scenario for computing system 100. In some examples, as described above, tip 26 of stylus 25 may be coated with an IR retro-reflective coating, the presence of which may be detected using IR camera 164B. In such examples, instructions 323 may identify the stylus input scenario as the current touch input scenario in response to detecting the presence of stylus 25 with IR camera 164B. In other examples the stylus input scenario may be detected in any other suitable manner.

In response to identification of the stylus input scenario by instructions 323, instructions 324 may identify a location of a tip of the stylus relative to the surface, based on characteristic(s) of the object represented in the image, such as a location of the stylus tip as represented in the captured image (e.g., image 702 of FIG. 7E). Referring to FIG. 7E, in such examples, instructions 324 may identify a region of surface 200 that is in close proximity to the identified tip location as a target touch region 730 of surface 200. In such examples, the identified target touch region 730 may exclude locations of surface 200 (e.g., non-target touch region 735) disposed below a palm of a hand holding stylus 25. In some examples, instructions 324 may utilize an image captured by IR camera 164B to determine a location of the tip 26 of the stylus 25 relative to surface 200.

In other examples, the object may be a hand, as illustrated in FIGS. 5 and 7A. In some examples, the current touch input scenario may be identified as a finger input scenario where input is to be received from a pointed finger, as illustrated in FIG. 7A. In such examples, instructions 323 may receive an indication from an application (e.g., applications 340) executing on computing device 150 that the finger input scenario is the current touch input scenario (e.g., when finger writing input is expected by the application). In such examples, a target touch region in close proximity to the pointed fingertip (and excluding surface 200 regions under the rest of the hand) may be identified.

In other examples when the object is a hand, instructions 323 may identify a hand input scenario as the current touch input scenario for computing system 100. In some examples, instructions 323 may identify the hand input scenario as the current touch input scenario as a default in response to determining that the current touch input scenario is not any of the other possible touch input scenarios (e.g., those described above). In other examples, the hand input scenario may be detected in any other suitable manner. Referring to FIG. 7C, in response to identification of the hand input scenario by instructions 323, instructions 324 may identify a segmentation boundary at least partially representing an outer edge of the hand based on at least image representing the object captured by at least one camera of sensor bundle 164, and extract a skeletal model for the hand based on characteristics of the object (i.e., hand) corresponding to the segmentation boundary, as described above. Instructions 324 may further identify respective locations of the fingertips of the hand relative to surface 200, based on the skeletal model, and for each of the identified fingertip locations, identify, as a target, touch region 720, a region of locations of surface 200 that are in close proximity to the identified fingertip location. In such examples, instructions 324 may identify the target touch regions 720 such each of the identified target touch regions 702 excludes locations of surface 200 disposed below the palm of the hand (e.g., locations of non-target touch region 725).

In some examples, instructions 322 may detect a trigger to initiate a projection, as described above. For example, the projection process may be triggered by an application (e.g., any of applications 340) being executed by computing device 150, a user input (e.g., requesting the process), or the like. In other examples, the projection process may be continually performed by computing system 100. In some examples, camera(s) of sensor bundle 164 may capture respective image(s) of the object in response to the projection process being triggered, or may be captured periodically in preparation to use such image(s) in a projection process, in examples in which the image(s) are captured before the trigger, the trigger may initiate the rest of the projection process described above after the capturing of the images. In some examples, features and functionalities described herein in relation to FIG. 8 may be provided in combination with features and functionalities described herein in relation to any of FIGS. 1-7F and 9-10.

Figure 9:
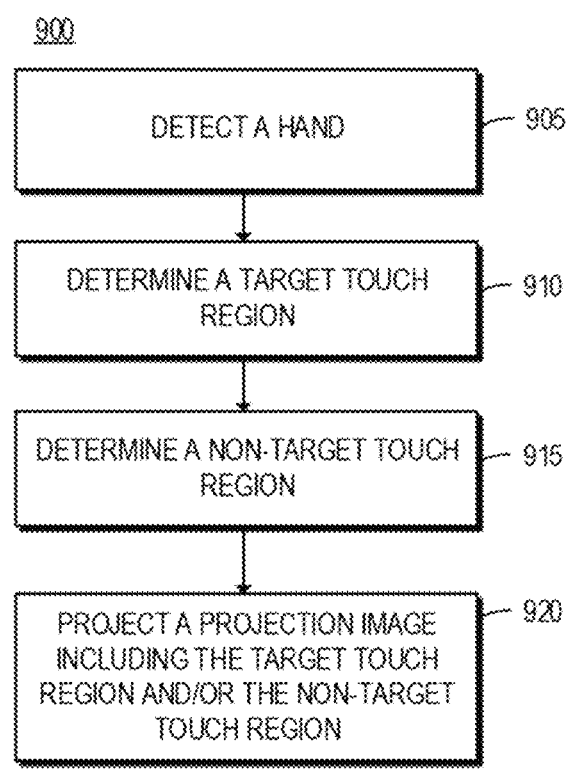
FIG. 9 is a flowchart of an example method for touch region projection onto a touch-sensitive surface.

FIG. 9 is a flowchart of an example method 900 for detecting a hand, determining one or more touch regions corresponding (e.g., spatially) to the hand, and projecting a projection image representing the touch region(s). Although execution of method 900 is described below with reference to computing system 100 of FIGS. 1-7B and 7D, other suitable systems for execution of method 900 can be utilized (e.g., system 100 with computing device 150). Additionally, implementation of method 900 is not limited to such examples.

At block 905, method 900 may detect a hand on or above touch-sensitive surface 200. For example, as described above, detection engine 170 of computing device 150 may detect the hand based on one or more images acquired by one or more cameras of sensor bundle 164, where the image(s) represent the hand. At block 910, the method may determine (e.g., based on the image(s)) a target touch region over which at least one fingertip of the hand is disposed. At block 915, the method may determine (e.g., based on the image(s)) a non-target touch region over which at least one fingertip of the hand is disposed. At block 920, the method may project a projection image on touch-sensitive surface 200, where the projection image includes a projected region spatially corresponding to (e.g., coinciding with) the target touch region and/or a projected region spatially corresponding to (e.g., coinciding with) the non-target, touch region. Whether or not to project each projected region may be determined, for example, based on projection configuration data (e.g., received from at least one of applications 340). The projection configuration data may also indicate one or more visual characteristics of the projected region(s).

Although the flowchart of FIG. 9 shows a specific order of performance of certain functionalities, method 900 is not limited to that order. For example, the functionalities shown in succession in the flowchart may be performed in a different order, may be executed concurrently or with partial concurrence, or a combination thereof. In some examples, features and functionalities described herein in relation to FIG. 9 may be provided in combination with features and functionalities described herein in relation to any of FIGS. 1-8.

What is claimed is:

1. A computing system comprising:
   a touch-sensitive surface;
   a camera to capture an image representing an object disposed between the camera and the touch-sensitive surface;
   a detection engine to identify, based at least on the object represented in the image, a touch region associated with the touch-sensitive surface, the touch region comprising at least one of a target touch region and a non-target touch region, wherein input within the target touch region is to be accepted and input within the non-target touch region is to be rejected;
   a projection engine to generate a projection image comprising a projected region corresponding to the target touch region; and
   a projector to project the projection image, including the target touch region, onto the touch-sensitive surface,
   wherein the object is a hand and the non-target touch region corresponds to an area on the touch-sensitive surface over which a palm of the hand is disposed.

2. The computing system of claim 1, wherein the camera comprises at least one of:
   an image sensor to capture image data representing the object;
   a depth sensor to capture depth data representing the object; or
   an infrared sensor to capture infrared data representing the object,
   wherein the detection engine is to identify the touch region of the touch-sensitive surface based on at least one of the image data, the depth data, and the infrared data.

3. The computing system of claim 1, wherein the target touch region of the projected region has at least one visual characteristic different from that of an area of the projection image surrounding the projected region, the visual characteristic comprising a background color, a background pattern, or a background brightness.

4. The computing system of claim 1, wherein the touch region comprises the target touch region from which a touch input is to be accepted, the target touch region being smaller than the touch-sensitive surface.

5. The computing system of claim 1, wherein the touch region comprises the non-target touch region from which a touch input is to be rejected, the non-target touch region being smaller than the touch-sensitive surface.

6. A non-transitory machine-readable storage medium comprising instructions executable by a processing resource of a computing system comprising a touch-sensitive surface and a camera, the instructions executable to:
   acquire, from the camera, an image representing an object disposed between the camera and the touch-sensitive surface;
   identify a current touch input scenario of a plurality of touch input scenarios;
   identify a touch region of the touch-sensitive surface based at least on the current touch input scenario and a location of a portion of the object as represented in the image, the touch region comprising a target touch region and a non-target touch region, wherein input within the target touch region is to be accepted and input within the non-target touch region is to be rejected; and
   project a projection image onto the touch-sensitive surface, the projection image comprising a projected region corresponding to the identified touch region,
   wherein the object is a hand and the non-target touch region corresponds to an area on the touch-sensitive surface over which a palm of the hand is disposed.

7. The non-transitory machine-readable storage medium of claim 6, wherein the camera comprises at least one of:
   an image sensor to capture image data representing the object;
   a depth sensor to capture depth data representing the object; or
   an infrared sensor to capture infrared data representing the object,
   wherein the instructions are executable to identify the at touch region of the touch-sensitive surface based on at least one of the image data, the depth data, or the infrared data.

8. The non-transitory machine-readable storage medium of claim 6, wherein the projected region has a visual characteristic different from that of an area of the projection image surrounding the projected region, the visual characteristic comprising a background color, a background pattern, or a background brightness.

9. The non-transitory machine-readable storage medium of claim 6, wherein the plurality of touch input scenarios comprise a hand input scenario and a stylus input scenario.

10. The non-transitory machine-readable storage medium of claim 6, wherein the touch region comprises the non-target touch region from which a touch input is to be rejected and the target touch region from which the touch input is to be accepted.

11. A method comprising:
    detecting an object on or above a touch-sensitive surface;
    determining a target touch region of the touch-sensitive surface based on a portion of the detected object associated with touch input;
    determining a non-target touch region of the touch-sensitive surface over which a palm of a hand is disposed;
    projecting a projection image on the touch-sensitive surface, the projection image comprising projected region corresponding to the target touch region and the non-target touch region, wherein input within the target touch region is to be accepted and input within the non-target touch region is to be rejected; and
    rejecting an input touch to the non-target touch region,
    wherein the object is a hand and the non-target touch region corresponds to an area on the touch-sensitive surface over which a palm of the hand is disposed.

12. The method of claim 11, further comprising acquiring an image representing the object, wherein detecting the object comprises detecting the object based at least on the image.

13. The method of claim 11, further comprising receiving projection configuration data, the projection configuration data comprising at least one visual characteristic of the projected region.

14. The method of claim 11, further comprising:
accepting a second input touch to the target touch region.

* * * * *